United States Patent

Ito et al.

[15] 3,645,462

[45] Feb. 29, 1972

[54] ENDLESS TAPE CARTRIDGE

[72] Inventors: Fukuzo Ito; Masaoki Sekine, both of Kanagawa-ken, Japan

[73] Assignee: Tokyo Denki Kagaku Kogyo Kabushiki Kaisha, Tokyo-to, Japan

[22] Filed: May 28, 1969

[21] Appl. No.: 828,498

[30] Foreign Application Priority Data

June 11, 1968 Japan..................................43/40161

[52] U.S. Cl. ......................................................242/55.19 A

[51] Int. Cl..........................................................B65h 17/48

[58] Field of Search ...............................242/55.19 A, 55.19; 179/100.2 Z; 274/4 B, 11 B; 74/206, 208, 798

[56] References Cited

UNITED STATES PATENTS 3,285,527 11/1966 Cole, Jr...........................242/55.19 A 3,304,019 2/1967 Myers.............................242/55.19 A

OTHER PUBLICATIONS

Wrona, German Printed Appt. No. 1,286,306, Jan. 2, 1969

*Primary Examiner*—Billy S. Taylor

*Attorney*—Blum, Moscovitz, Friedman & Kaplan

[57] ABSTRACT

A tape recorder cartridge having a single hub on which a looped endless tape is wound up in a convoluted manner. The hub consists of the main driving wheel for taking up the tape and a driven wheel rotatably mounted on the outer periphery of the main driving wheel with torque transmitting means therebetween. The endless tape is arranged for being wound up on the outer periphery of the driven wheel, pulled out of the innermost convolution of the tape wound up on the driven wheel, and rewound on the outermost convolution on the periphery of the driven wheel.

3 Claims, 5 Drawing Figures

ENDLESS TAPE CARTRIDGE

DETAILED DESCRIPTION OF THE INVENTION

This invention relates to an endless tape cartridge for magnetic sound-recording and playback by use of a magnetic looped tape of an endless array.

Hitherto a cartridge known as a miniature cassette has left and right reels rotatably mounted in opposite but still it had complexities in construction and troubles in the manufacture and operation because of the necessity of means for automatic reverse rotation to be provided on the reproduction side of the cartridge for its continuous operation resulting in high cost of production. In place of the above-described method there was an attempt to provide one in which an endless tape is wound on a single hub and from the center of which is carried out a tape and the tape is rewound on the outermost convolution of a wound tape after running over the wound tape on the outer periphery of the hub and further passing a tape driving part and a recording and playback part to continuously run the tape endlessly. The described method however has disadvantages that a portion of the tape carried out from the center of the hub should pass between the hub and the wound tape on the outer periphery of the hub and due to multiplied convolutions of the wound tape and particularly to tight winding of the central part there often occurred large frictional resistance between the hub and the tape undesirably causing tension in the part of friction and irregular running of tape which may interfere with the continuous operation. Complicated construction of a further mechanism to be provided for remedying the twist of the carried-out tape was another disadvantage.

Therefore a primary object of this invention is to eliminate such disadvantages and provide a simple apparatus to facilitate the continuous operation of the endless tape by carrying the tape outward just from a single hub.

Another object of this invention is to provide an apparatus for guiding the tape out of the hub on which the endless tape is wound and carrying the tape out of the wound part of the tape without losing its smoothness by fair rotation.

Still another object of this invention is to enable the endless tape of a looped type in a cartridge to run free of excessive load being applied in its operation and safely operated without breakage howsoever the tape is thin.

It is a further object of this invention to provide an endless tape cartridge that can make correction of twist and change of direction of a running tape carried out of the hub desirably, guarantee its continuous operation, lessen the damage of the tape, and facilitate the release of tightening of the tape, which is simple in construction, low cost, and adapted for mass production.

To accomplish the above-described objects, the present invention essentially provides an endless tape cartridge, characterized in that the hub has a dual construction of a main driving part and a driven part rotatably fitted to said main driving part on its outer periphery the driven part having attached thereto a circular plate on which the tape is coiled and is positively driven for rotation whereby the innermost convolution of the wound endless tape is carried out and the thus carried-out portion is conveyed over the convolutions of the wound tape while making correction of twist, and is finally wound back on the outermost convolution of the wound tape part through the driving part and the recording and playback parts.

There is also provided, adjacent to the circular plates a guide rotary wheel having the slanted peripheral surface and a guidepost which compensate for the twist in the tape leaving the hub. The tape leaving the hub periphery passes over the inclined surface of the guide wheel and over the guidepost, drive part, recording and playback parts and is then rewound on the outer periphery of the wound part.

With the driving means of this invention being constructed as described above, the counterclockwise rotation (direction indicated by an arrow) of the main driving part *4a* of hub 4 causes the same rotation of the driven part *4b* so that the winding of the wound tape part *6a* on the outer periphery is tightened. However, since the hub 4 is of a dual construction capable of planetary rotation and the driven part *4b* is always smaller in angular speed of rotation relative to the main driving part *4a* and driven positively, the tightening of winding is so much lessened and the innermost convolution (namely, the convolution is in contact with the outer peripheral surface of the hub *4d*) of the wound tape part *6a* is pulled and carried outwardly from the hub.

According to this invention, the tightening force exerted on the wound tape is lessened in the carried-out portion of the tape which contacts the outer periphery of the single hub wound by the endless tape so that the carried-out portion of the tape is smoothly and successively delivered by driving movement of the hub and continuous operation of the endless tape.

The present invention is further advantageous in that the wound tape on the hub is guided outwardly and smoothly, keeping accurate operation and free of excessive load in running. Even a thinner tape can be used without breakage to provide a possibly large amount of tape wound on the hub for reservation.

The accompanying drawings show embodiments of the invention, in which.

Figure 1:
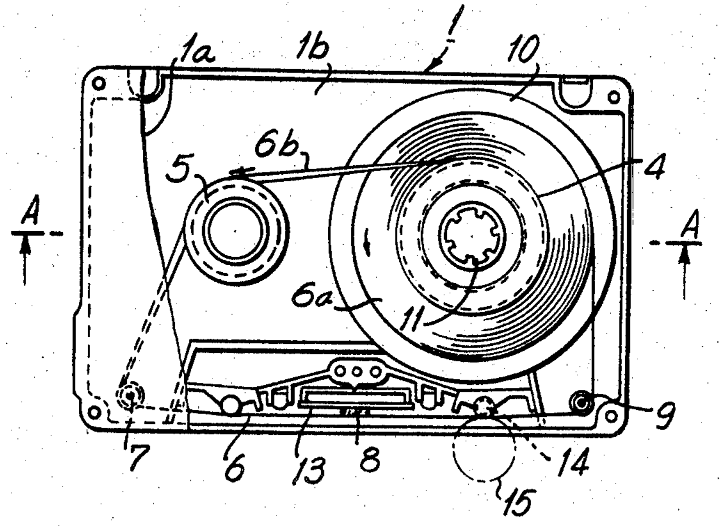
FIG. 1 is a plan view, a part cut away, of tape cartridge.
Figure 2:
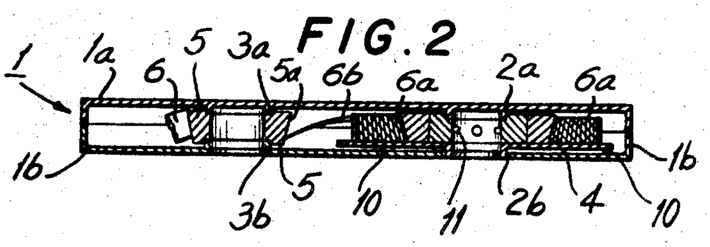
FIG. 2 is a sectional view of the tape cartridge, taken on the line A—A in FIG. 1.
Figure 3:
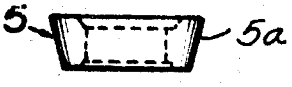
FIG. 3 is an enlarged side view of a guide rotary wheel.
Figure 4:
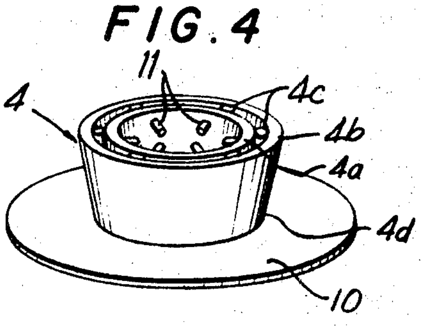
FIGS. 4 and 5 are enlarged perspective views showing other embodiments of the hub of this invention.
Figure 5:
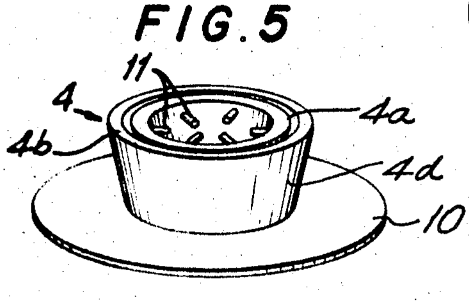

Referring now to FIGS. 1 and 2, a housing 1 of the tape cartridge is formed of a pair of upper and lower outer covers shown at *1a* and *1b*. Hub 4 and guide rotary wheel 5 are rotatably carried by supports *2a*, *2b*, *3a* and *3b* formed on the outer covers *1a* and *1b*. The above-described hub 4 is formed of a dual construction consisting of a main driving part *4a* and a driven part *4b* fitted to the outer periphery of the main driving part *4a* in a frictional or planetary rotation manner. Wound on the outer periphery of the hub 4 is convolutions *6a* of a endless tape 6. The guide rotary wheel 5 is formed in a tapered form at the outer peripheral surface *5a* which is in contact with the carried-out portion *6b* of the tape. The wound tape portion *6a* is pulled out at its innermost convolution or the tape portion adjacent to the outer periphery of the hub 4, the thus carried-out portion *6b* is trained over the outer peripheral surface *5a* of the guide rotary wheel 5 across over the wound tape part *6a* and rewound on the wound tape part *6a* after passing the guidepost 7, the pressure pad 8, and the guidepost 9.

In order to obtain the hub 4 of a dual construction, it is preferable that buffer rollers *4c* are provided between the outer periphery of the main driving part *4a* and the inner periphery of the driven part *4b* so as to facilitate the planetary rotation of the driven part *4b*, and that the outer peripheral surface *4d* of the driven part *4b* is obliquely formed in an inverted tapered shape inclined in the direction of pulling out of the tape so as to pull out the tape more easily. It is also possible to provide a double construction in the hub 4 by applying a cushioning material such as felt between the outer periphery of the main driving part *4a* and the inner periphery of the driven part *4b* or a small clearance sufficient for producing partial friction between the driven part *4b* of the inside hub and the main driving part *4a* of the outside hub to effect the planetary rotation. Correction of twist of the running tape and the change of direction of the tape may desirably be made by fitting the guidepost 7 in an obliquely inclined way.

In the drawing, numeral 10 is a circular plate of Teflon, polyacetal resin and like smooth material which is rotatably or fixedly provided on the main driving part *4a* or on the driven part *4b* of the inside hub. 11 is a pawl on the hub 4, which is engageable with the driving shaft. 13 is a shield plate. Further, numerals 14 and 15 designate respectively capstan roller and pinch roller provided on the reproducing part.

It is also possible that a Teflon or other resinous sheet (not shown) is provided on the upper surface of the hub 4 so as to readily pull or rewind the tape or said sheet member 10 can be formed in a disk form which is transmitted the rotation for driving the hub 4.

What I claim is:

1. An endless tape cartridge having a dual construction comprising a hollow inner, driving hub having a bottom, a drive-pawl within said driving hub, an outer, driven hub surrounding said driving hub, said driven hub having an inverted, tapered shape, a disc mounted rigidly and concentrically in the region of the smaller end of said driven hub, and transmitting means between said inner and outer hubs for transmitting torque from said inner hub to said outer hub while permitting slippage therebetween, said disc serving to hold wound tape, to feed tape outward over the wound tape from the innermost convolution thereof and to receive tape at the outer periphery thereof.

2. The cartridge as defined in claim 1, wherein said transmitting means comprises buffer rollers.

3. The cartridge as defined in claim 1, wherein said transmitting means is a Teflon disc mounted rigidly and concentrically at the bottom region of said driving hub.

* * * * *